(12) United States Patent
Ryu et al.

(10) Patent No.: US 11,758,425 B2
(45) Date of Patent: Sep. 12, 2023

(54) TECHNIQUES FOR INDICATING A USER EQUIPMENT CAPABILITY FOR LAYER 1 SIGNAL TO INTERFERENCE PLUS NOISE RATIO MEASUREMENT

(71) Applicant: QUALCOMM Incorporated, San Diego, CA (US)

(72) Inventors: Jung Ho Ryu, Fort Lee, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/949,974

(22) Filed: Nov. 23, 2020

(65) Prior Publication Data
US 2021/0243629 A1    Aug. 5, 2021

Related U.S. Application Data

(60) Provisional application No. 62/968,932, filed on Jan. 31, 2020.

(51) Int. Cl.
*H04W 24/10* (2009.01)
*H04W 8/24* (2009.01)
*H04B 17/336* (2015.01)

(52) U.S. Cl.
CPC .......... *H04W 24/10* (2013.01); *H04B 17/336* (2015.01); *H04W 8/24* (2013.01)

(58) Field of Classification Search
CPC ....... H04W 24/10; H04W 8/24; H04B 17/336
See application file for complete search history.

(56) References Cited

U.S. PATENT DOCUMENTS

| 2013/0242796 A1* | 9/2013 | Chen ...................... H04L 5/001 370/252 |
| 2016/0150572 A1* | 5/2016 | Quan ................... H04L 1/1607 370/329 |

(Continued)

FOREIGN PATENT DOCUMENTS

| WO | 2017109551 A1 | 6/2017 |
| WO | 2018199681 A1 | 11/2018 |

OTHER PUBLICATIONS

"3rd Generation Partnership Project, Technical Specification Group Radio Access Network, NR, Physical Layer Measurements (Release 16)," 3GPP Standard, Technical Specification, 3GPP TS 38.215, 3rd Generation Partnership Project (3GPP), Mobile Competence Centre, 650, Route Des Lucioles, F-06921, Sophia-Antipolis Cedex, France, vol. RAN WG1. No. V16.0.1, Jan. 14, 2020 (Jan. 14, 2020), XP051860778, pp. 1-21, Retrieved from the Internet: URL: http://ftp.3gpp.org/Specs/archive/38_series/38.215/38215-g01.zip 38215-g01.docx [retrieved on Jan. 14, 2020] paragraph 5 .1. 5 paragraph 5 .1. 6.

(Continued)

*Primary Examiner* — Zhiren Qin
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may transmit, to a base station, information indicating a Layer 1 signal to interference plus noise ratio (L1-SINR) measurement capability of the UE. The UE may receive, from the base station, a reference signal carried on one or more resources based at least in part on the L1-SINR measurement capability. Numerous other aspects are provided.

30 Claims, 7 Drawing Sheets

(56) References Cited

U.S. PATENT DOCUMENTS

| | | | | |
|---|---|---|---|---|
| 2019/0089423 | A1* | 3/2019 | Davydov | H04B 7/0417 |
| 2019/0306924 | A1* | 10/2019 | Zhang | H04L 5/0094 |
| 2020/0007299 | A1* | 1/2020 | Han | H04W 72/042 |
| 2020/0304257 | A1* | 9/2020 | Kim | H04L 5/0053 |
| 2021/0120444 | A1 | 4/2021 | Yum et al. | |
| 2021/0288730 | A1* | 9/2021 | Zhou | H04W 24/10 |
| 2021/0337415 | A1* | 10/2021 | Chen | H04W 24/10 |
| 2022/0014957 | A1* | 1/2022 | Guo | H04L 5/0057 |
| 2022/0038194 | A1* | 2/2022 | Matsumura | H04L 5/005 |
| 2022/0256382 | A1* | 8/2022 | Kang | H04B 17/336 |
| 2022/0286175 | A1 | 9/2022 | Matsumura et al. | |

OTHER PUBLICATIONS

"3rd Generation Partnership Project, Technical Specification Group Radio Access Network, NR, Physical Layer Procedures for Data (Release 16)", 3GPP Standard, Technical Specification, 3GPP TS 38.214, 3rd Generation Partnership Project (3GPP), Mobile Competence Centre, 650, Route Des Lucioles, F-06921, Sophia-Antipolis Cedex, France, vol. RAN WG1, No. V16.0.0, Dec. 2019, Jan. 14, 2020 (Jan. 14, 2020), XP051860777, pp. 1-147, Retrieved from the Internet: URL: http://ftp.3gpp.org/Specs/archive/38_series/ 38.214/38214-g00.zip38214-g00.docx [retrieved on Jan. 14, 2020] sections 5.1.6.1-5.1.6.1.1, 5.1.6.3, 5.1.6.5, 5.2.1.4 and 5.2.25, paragraphs [5.2.1.5], [5.2.2], paragraph 5.2.1 .6, paragraph 5.4, paragraph 6.1, paragraph 5.1.6.1.2, paragraph 5.2.1.4.4.

"3rd Generation Partnership Project; Technical Specification Group Radio Access Network; NR; user Equipment (UE) radio access capabilities (Release 15)," 3GPP Standard; Technical Specification, 3GPP TS 38.306, 3rd Generation Partnership Project (3GPP), Mobile Competence Centre; 650, Route Des Lucioles; F-06921, Sophia-Antipolis Cedex France, vol. RAN WG2. No. V15.8.0, (Dec. 2019), pp. 1-52, XP051860597, Retrieved from the Internet: URL:http://ftp.3gpp.org/Specs/archive/38_series/38.306/38306-f80. zip 38306-f80.docx [retrieved on Jan. 8, 2020] p. 50-p. 51.

Ericsson: "Remaining Issues on Multi-Beam Enhancements", 3GPP Draft, 3GPP TSG-RAN WG1 Meeting #98bis, R1-1911224, Remaining Issues on Multi-Beam Enhancements, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 4, 2019 (Oct. 4, 2019), XP051808346, 15 pages, Retrieved from the Internet: URL: https://ftp.3gpp.org/tsg_ran/WG1_RL1/TSGR1_98b/Docs/ R1-1911224.zip. R1-1911224 Remaining issues on multi-beam enhancements.docx [retrieved on Oct. 4, 2019] p. 9, paragraph 2.3.

International Search Report and Written Opinion—PCT/US2021/ 070089—ISA/EPO—dated May 11, 2021.

NTT Docomo, Inc: "Discussion on Multi-Beam Enhancement," 3GPP Draft, 3GPP TSG RAN WG1 Meeting #99, R1-1912894, 3rd Generation Partnership Project (3GPP), Mobile Competence Centre, 650, Route Des Lucioles, F-06921, Sophia-Antipolis Cedex, France, vol. RAN WG1. No. Reno, USA, Nov. 18, 2019-Nov. 22, 2019, Nov. 8, 2019 (Nov. 8, 2019), XP051820230, pp. 1-15, Retrieved from the Internet: URL:https://ftp.3gpp.org/tsg_ran/WG1_ RL1/TSGR1_99/Docs/R1-1912894.zip R1-1912894.docx [retrieved on Nov. 8, 2019] paragraph 4.2.1 paragraph 4.2.2.

* cited by examiner

TECHNIQUES FOR INDICATING A USER EQUIPMENT CAPABILITY FOR LAYER 1 SIGNAL TO INTERFERENCE PLUS NOISE RATIO MEASUREMENT

CROSS-REFERENCE TO RELATED APPLICATION

This Patent Application claims priority to U.S. Provisional Patent Application No. 62/968,932, filed on Jan. 31, 2020, entitled "TECHNIQUES FOR INDICATING A USER EQUIPMENT CAPABILITY FOR LAYER 1 SIGNAL TO INTERFERENCE PLUS NOISE RATIO MEASUREMENT," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for indicating a user equipment (UE) capability for Layer 1 signal to interference plus noise ratio (L1-SINR) measurement.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies and the telecommunication standards that employ these technologies remain useful.

SUMMARY

In some aspects, a method of wireless communication, performed by a user equipment (UE), may include: transmitting, to a base station, information indicating a Layer 1 signal to interference plus noise ratio (L1-SINR) measurement capability of the UE; and receiving, from the base station, a reference signal carried on one or more resources based at least in part on the L1-SINR measurement capability.

In some aspects, a method of wireless communication, performed by a base station, may include: receiving, from a UE, information indicating an L1-SINR measurement capability of the UE; and transmitting, to the UE, a reference signal carried on one or more resources based at least in part on the L1-SINR measurement capability.

In some aspects, a UE for wireless communication may include a memory and one or more processors operatively coupled to the memory. The memory and the one or more processors may be configured to: transmit, to a base station, information indicating an L1-SINR measurement capability of the UE; and receive, from the base station, a reference signal carried on one or more resources based at least in part on the L1-SINR measurement capability.

In some aspects, a base station for wireless communication may include a memory and one or more processors operatively coupled to the memory. The memory and the one or more processors may be configured to: receive, from a UE, information indicating an L1-SINR measurement capability of the UE; and transmit, to the UE, a reference signal carried on one or more resources based at least in part on the L1-SINR measurement capability.

In some aspects, a non-transitory computer-readable medium may store one or more instructions for wireless communication. The one or more instructions, when executed by one or more processors of a UE, may cause the one or more processors to: transmit, to a base station, information indicating an L1-SINR measurement capability of the UE; and receive, from the base station, a reference signal carried on one or more resources based at least in part on the L1-SINR measurement capability.

In some aspects, a non-transitory computer-readable medium may store one or more instructions for wireless communication. The one or more instructions, when executed by one or more processors of a base station, may cause the one or more processors to: receive, from a UE, information indicating an L1-SINR measurement capability of the UE; and transmit, to the UE, a reference signal carried on one or more resources based at least in part on the L1-SINR measurement capability.

In some aspects, an apparatus for wireless communication may include: means for transmitting, to a base station, information indicating an L1-SINR measurement capability of the apparatus; and means for receiving, from the base station, a reference signal carried on one or more resources based at least in part on the L1-SINR measurement capability.

In some aspects, an apparatus for wireless communication may include: means for receiving, from a UE, information indicating an L1-SINR measurement capability of the UE; and means for transmitting, to the UE, a reference signal carried on one or more resources based at least in part on the L1-SINR measurement capability.

In some aspects, the information indicating the L1-SINR measurement capability jointly indicates whether the UE supports a plurality of configurations for the one or more resources to carry the reference signal.

In some aspects, the plurality of configurations for the one or more resources to carry the reference signal include a first configuration in which the one or more resources to carry the reference signal include a channel measurement resource (CMR) without a dedicated interference measurement resource (IMR), a second configuration in which the one or more resources to carry the reference signal include a CMR with a dedicated zero power IMR (ZP IMR), a third configuration in which the one or more resources to carry the reference signal include a CMR with a dedicated non-zero power IMR (NZP IMR), and a fourth configuration in which the one or more resources to carry the reference signal include a CMR with a dedicated ZP IMR and a dedicated NZP IMR.

In some aspects, the information indicating the L1-SINR measurement capability separately indicates whether the UE supports one or more individual configurations for the one or more resources to carry the reference signal.

In some aspects, the one or more individual configurations include a configuration in which the one or more resources to carry the reference signal include a CMR without a dedicated IMR.

In some aspects, the one or more individual configurations include a configuration in which the one or more resources to carry the reference signal include a CMR with a dedicated IMR in which the base station does not transmit a signal.

In some aspects, the one or more individual configurations include a configuration in which the one or more resources to carry the reference signal include a CMR with a dedicated NZP IMR.

In some aspects, the one or more individual configurations include a configuration in which the one or more resources to carry the reference signal include a CMR with a dedicated IMR and a dedicated NZP IMR.

In some aspects, the method performed by the UE may include obtaining an L1-SINR measurement based at least in part on the reference signal; and transmitting, to the base station, a report including the L1-SINR measurement.

In some aspects, the UE may obtain an L1-SINR measurement based at least in part on the reference signal; and transmit, to the base station, a report including the L1-SINR measurement.

In some aspects, the one or more instructions further cause the one or more processors of the UE to obtain an L1-SINR measurement based at least in part on the reference signal; and transmit, to the base station, a report including the L1-SINR measurement.

In some aspects, the apparatus may include means for obtaining an L1-SINR measurement based at least in part on the reference signal; and means for transmitting, to the base station, a report including the L1-SINR measurement.

In some aspects, the method performed by the base station may include receiving, from the UE, a report including an L1-SINR measurement obtained by the UE based at least in part on the reference signal.

In some aspects, the base station may receive, from the UE, a report including an L1-SINR measurement obtained by the UE based at least in part on the reference signal.

In some aspects, the one or more instructions further cause the one or more processors of the base station to receive, from the UE, a report including an L1-SINR measurement obtained by the UE based at least in part on the reference signal.

In some aspects, the apparatus may include means for receiving, from the UE, a report including an L1-SINR measurement obtained by the UE based at least in part on the reference signal.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
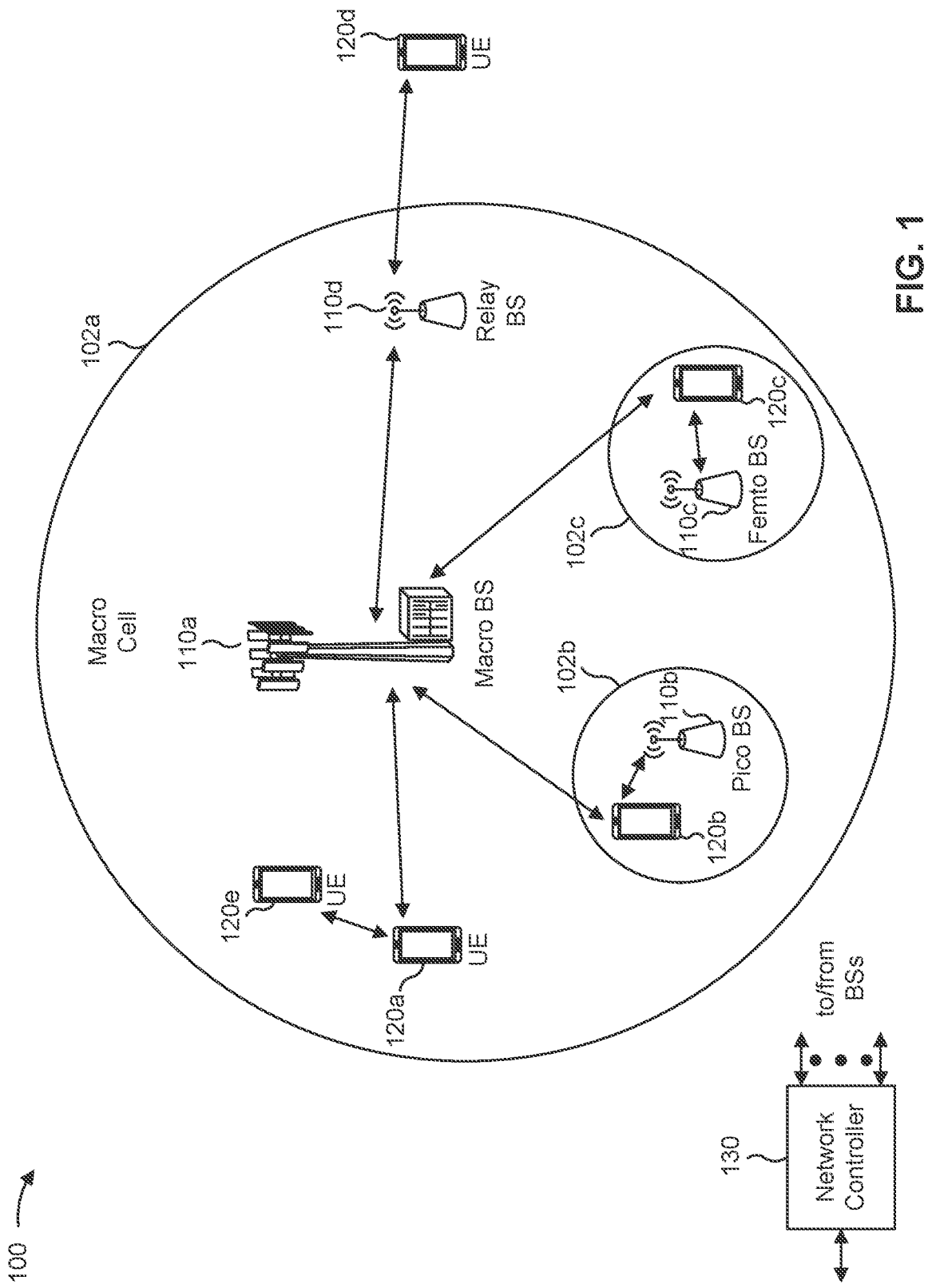
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
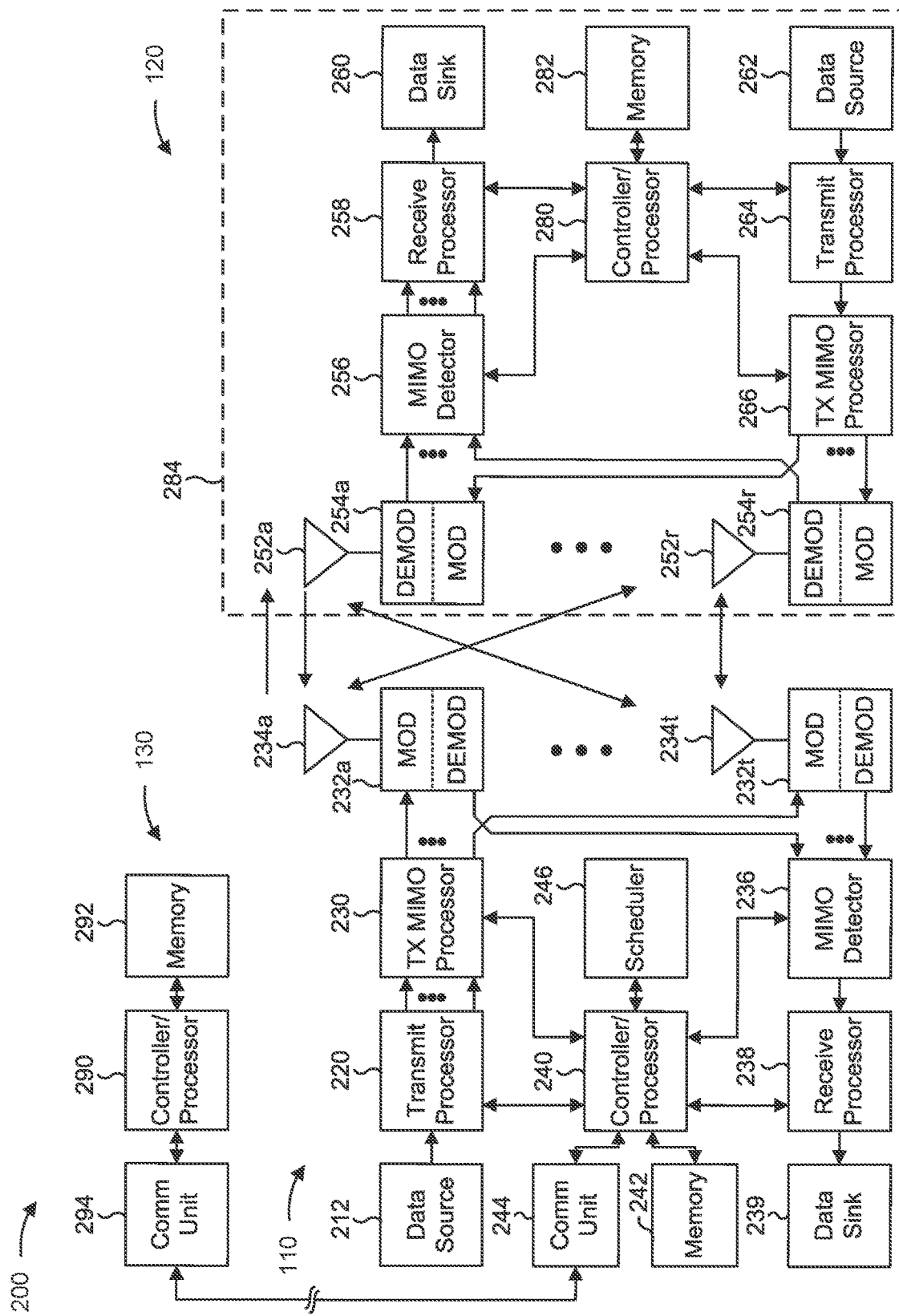
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with indicating a capability of UE 120 for Layer 1 signal to interference plus noise ratio (L1-SINR) measurement, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some aspects, executing instructions may include running the instructions, converting the instructions, compiling the instructions, interpreting the instructions, and/or the like.

In some aspects, UE 120 may include means for transmitting, to base station 110, information indicating an L1-SINR measurement capability of UE 120, means for receiving, from base station 110, a reference signal carried on one or more resources based at least in part on the L1-SINR measurement capability, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving, from UE 120, information indicating an L1-SINR measurement capability of UE 120, means for transmitting, to UE 120, a reference signal carried on one or more resources based at least in part on the L1-SINR measurement capability, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

In a wireless network, such as an NR network and/or the like, a UE may obtain one or more Layer 1 (L1) measurements based on reference signals that are transmitted by one or more base stations, and the UE may transmit a report that includes the L1 measurement(s) to the base station to enable the base station to control transmission parameters such as transmission power, beamforming configurations, and/or the like. For example, in some cases, the L1 measurements may include a reference signal received power (RSRP) measurement, which the UE may obtain by measuring a power of a reference signal received from any nearby transmitter without regard to whether the measured power includes a signal (e.g., from a serving base station) or interference (e.g., from neighboring base stations). Accordingly, in NR, L1-SINR measurements have been added as a value that can be reported in a measurement report, such as a channel state information (CSI) report. For example, in order to obtain an L1-SINR measurement, a UE may measure a signal separately from interference. In general, L1-SINR measurements are captured over a shorter duration of time than other L1 measurements, such as an L1-RSRP measurement, whereby L1-SINR measurements may be useful in capturing instantaneous SINR measurements, unfiltered measurements, measurements that are not long enough for interfering base stations to cycle through many downlink beams, measurements where an interference term is not averaged over many transmit beams and/or receive beams, and/or the like.

However, there are several different techniques that can be used to transmit a reference signal that enables a UE to obtain an L1-SINR measurement. For example, the reference signal may be transmitted using a channel measurement resource (CMR) without a dedicated interference management resource (IMR), using a CMR with a dedicated IMR (e.g., a zero power IMR (ZP IMR) and/or a CSI IMR), using a CMR with a dedicated non-zero power IMR (NZP IMR), using a CMR with a dedicated ZP IMR and a dedicated NZP IMR, and/or the like. Accordingly, UEs may not universally support all possible L1-SINR measurement techniques, and in some cases, a UE may support only legacy L1 measurement techniques (e.g., may only support L1-RSRP measurements and lack support for any L1-SINR measurement techniques). In this regard, without knowing the specific L1-SINR measurement techniques supported by a UE (if any), a base station may be unable to properly configure a reference signal to be transmitted to the UE.

Some aspects described herein relate to techniques and apparatuses for indicating a UE capability for L1-SINR measurement to a base station. For example, in some aspects, a UE may transmit information indicating an L1-SINR measurement capability of the UE to the base station, which may enable the base station to configure one or more resources used to transmit a reference signal based at least in part on the L1-SINR measurement capability of the UE. In this way, the base station may transmit, and the UE may receive, a reference signal on one or more resources that are based at least in part on the L1-SINR measurement capability such that the UE may obtain one or more L1 measurements that are supported by the UE. In this way, when the UE supports one or more L1-SINR measurement techniques, the base station may configure and/or select the reference signal according to the supported L1-SINR measurement technique(s), which may enable the UE to provide the base station with instantaneous SINR measurements, unfiltered measurements, measurements that are not long enough for interfering base stations to cycle through many downlink beams, and/or the like. Additionally, or alternatively, when the UE does not support any L1-SINR measurement techniques, the base station may configure the reference signal according to the legacy L1 measurement technique(s) supported by the UE to ensure that the UE is still able to obtain and report information that the base station can use to configure transmission parameters for the UE.

Figure 3:
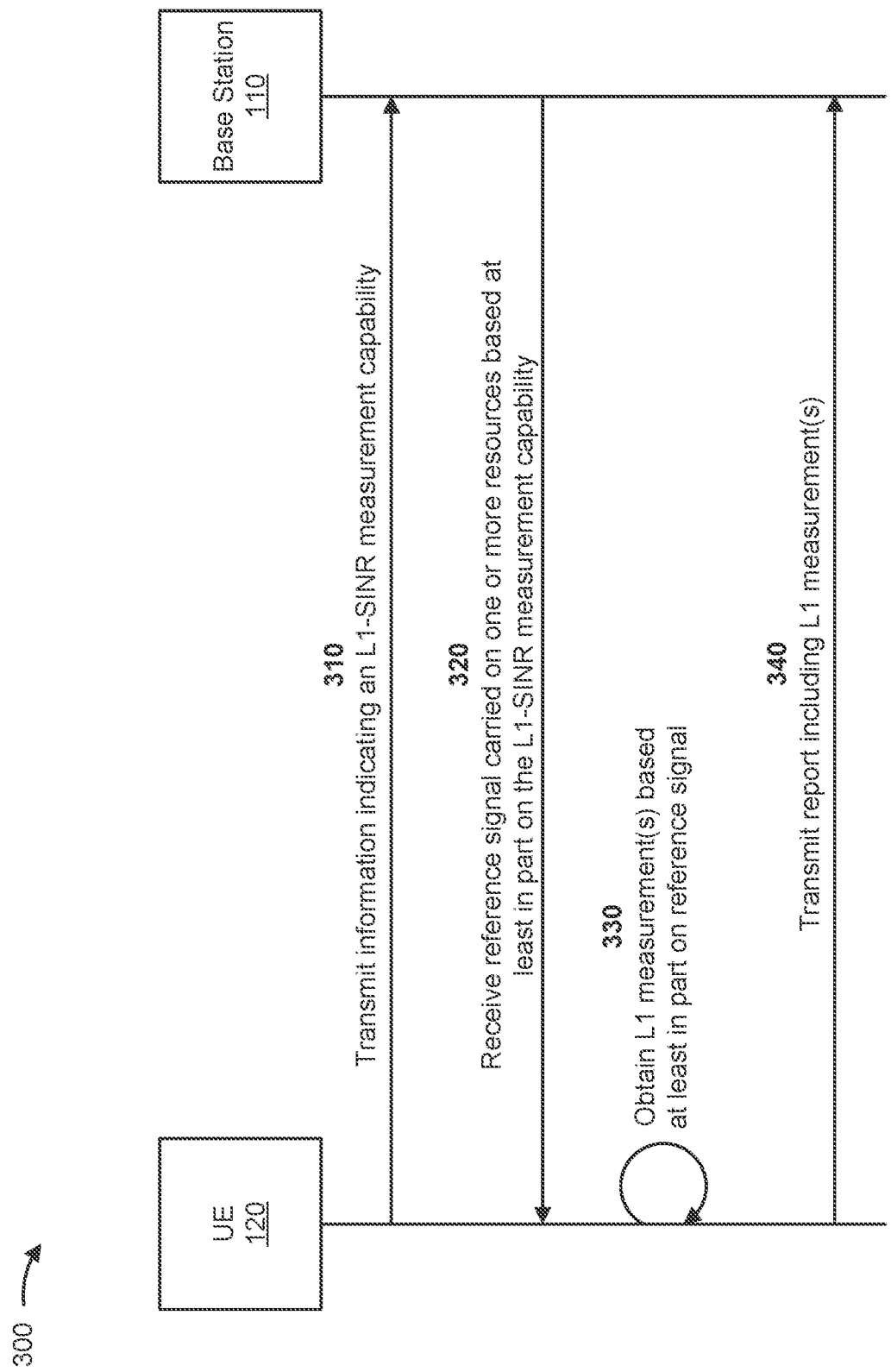
FIG. 3 is a diagram illustrating an example of indicating a UE capability for Layer 1 signal to interference plus noise ratio (L1-SINR) measurement, in accordance with various aspects of the present disclosure.

FIG. 3 is a diagram illustrating an example 300 of indicating a UE capability for L1-SINR measurement, in accordance with various aspects of the present disclosure. As shown in FIG. 3, example 300 includes a UE 120 in communication with a base station 110 over a wireless network (e.g., wireless network 100).

In some aspects, as described herein, the wireless network may support various resource configurations to enable L1-SINR measurements. For example, in some aspects, the resource configurations may include a configuration in which a reference signal (e.g., a synchronization signal block (SSB) and/or a channel state information reference signal (CSI-RS), among other examples) is transmitted using a CMR without a dedicated IMR, a configuration in which the reference signal is transmitted using a CMR with a dedicated resource in which the base station 110 does not transmit a signal (e.g., a ZP IMR and/or a CSI IMR), a configuration in which the reference signal is transmitted using a CMR with a dedicated NZP IMR, a configuration in which the reference signal is transmitted using a CMR with a dedicated ZP IMR and/or CSI IMR and a dedicated NZP IMR, and/or the like. Furthermore, in some aspects, the wireless network may support one or more resource configurations to enable legacy L1 measurements (e.g., L1-RSRP measurements).

As shown in FIG. 3, and by reference number 310, the UE 120 may transmit, and the base station 110 may receive, information indicating an L1-SINR measurement capability of the UE 120. For example, in some aspects, the information indicating the L1-SINR measurement capability may jointly indicate whether the UE 120 supports all L1-SINR resource configurations that are enabled in the wireless network. For example, the L1-SINR measurement capability may include a value of '1', 'supported', and/or the like to indicate that the UE 120 supports all L1-SINR resource configurations that are enabled in the wireless network or a value of '0', 'not supported', and/or the like to indicate that the UE 120 does not support any L1-SINR resource configurations (e.g., supports only legacy L1 measurements).

Additionally, or alternatively, the information indicating the L1-SINR measurement capability of the UE 120 may separately indicate whether the UE 120 supports individual L1-SINR resource configurations enabled in the wireless network. For example, the UE 120 may transmit one or more L1-SINR measurement capabilities to separately indicate whether the UE 120 supports L1-SINR measurements on a CMR without a dedicated IMR, on a CMR with a dedicated ZP IMR or CSI IMR, on a CMR with a dedicated NZP IMR, on a CMR with a dedicated ZP IMR and a dedicated NZP IMR, and/or the like. For example, the one or more L1-SINR measurement capabilities may each be associated with a candidate value set of {'0', '1'}, {'supported', 'not supported'}, and/or the like, and the UE 120 may provide, to the base station 110, one of the values in the candidate value set to separately indicate an L1-SINR measurement capability for one or more of the L1-SINR resource configurations. For example, in some aspects, the information indicating the L1-SINR measurement capability may include a bitmap that has one or more entries, each of which correspond to one L1-SINR resource configuration and have a value to indicate whether the UE 120 supports a capability to obtain an L1-SINR measurement using the corresponding L1-SINR resource configuration. In some aspects, each L1-SINR resource configuration and corresponding L1-SINR measurement capability may be indicated according to an association between a reference signal and the CMR used for the signal measurement (e.g., an SSB or a CSI-RS used as the CMR) and a resource used for the interference measurement (e.g., a dedicated CSI IMR, a dedicated NZP IMR, and/or no dedicated or configured IMR, among other examples).

As further shown in FIG. 3, and by reference number 320, the base station 110 may transmit, and the UE 120 may receive, a reference signal on one or more resources that are based at least in part on the L1-SINR measurement capability of the UE 120. For example, in cases where the UE 120 indicates that one or more L1-SINR measurement techniques are supported, the reference signal may be an SSB, a CSI-RS, and/or another suitable reference signal transmitted on a CMR, which may include a set of time and frequency resources used to measure a channel. Furthermore, in cases where the UE 120 indicates that the supported L1-SINR measurement techniques include techniques associated with a dedicated IMR (e.g., a dedicated ZP IMR, CSI IMR, NZP IMR, and/or the like), the base station 110 may configure the IMR according to the indicated capabilities. For example, in some aspects, the IMR may generally include a dedicated set of time and frequency resources that are separate from the CMR and used to enable the UE 120 to measure interference separately from the signal transmitted via the CMR. Alternatively, in cases where the UE 120 indicates that the UE 120 lacks support for any L1-SINR measurement techniques, the base station 110 may transmit the reference signal using a set of time and frequency resources associated with legacy L1 measurements.

As further shown in FIG. 3, and by reference number 330, the UE 120 may obtain one or more L1 measurements based at least in part on the reference signal. For example, when the reference signal is transmitted on a CMR without a dedicated IMR based at least in part on the UE 120 indicating support for L1-SINR measurement on a CMR without a dedicated IMR, the UE 120 may measure the reference signal transmitted by the base station 110 on the CMR and, in this case, there would not be any IMR that includes a separate configuration to enable the UE 120 to measure interference. Rather, to measure the interference, the UE 120 may collect signal power in one or more time and frequency resources that are outside of a set of time and frequency resources that are scheduled for the UE 120 (e.g., outside the CMR or in other time and frequency resources where the UE 120 is not intended to be a target receiver).

Additionally, or alternatively, when the reference signal is transmitted on a CMR with a dedicated IMR (e.g., a ZP IMR and/or CSI IMR) based at least in part on the UE 120 indicating support for L1-SINR measurement on a CMR with a dedicated IMR, the UE 120 may measure the reference signal transmitted by the base station 110 on the CMR in a similar manner as described above. However, in this case, the base station 110 may configure a separate dedicated ZP IMR and/or CSI IMR, which may include a set of time and frequency resources in which the base station 110 will not transmit a signal (e.g., the base station 110 does not transmit or transmits with zero power in the set of time and frequency resources corresponding to the IMR). Accordingly, in this case, any signal power that the UE 120 collects or otherwise measures in the set of time and frequency resources corresponding to the IMR may be considered interference (e.g., background interference caused by signals transmitted by other, nearby base stations).

Additionally, or alternatively, when the reference signal is transmitted on a CMR with a dedicated NZP IMR based at least in part on the UE 120 indicating support for L1-SINR measurement on a CMR with a dedicated NZP IMR, the UE 120 may measure the reference signal transmitted by the base station 110 on the CMR in a similar manner as described above. In this case, the base station 110 may configure a separate dedicated NZP IMR, which may include a set of time and frequency resources in which only the base station 110 transmits the reference signal. Accordingly, in this case, the signal measurement may be obtained from the reference signal transmitted on the NZP IMR, which may be subtracted from the signal power measured on the CMR such that a difference between the signal power measured on the NZP IMR and the signal power measured on the CMR may be considered interference.

Additionally, or alternatively, when the reference signal is transmitted on a CMR with a dedicated ZP or CSI IMR and a dedicated NZP IMR based at least in part on the UE 120 indicating support for L1-SINR measurement on a CMR with a dedicated ZP or CSI IMR and a dedicated NZP IMR, the reference signal may be transmitted and measured using the dedicated ZP or CSI IMR technique described above, the dedicated NZP IMR technique described above, and/or a combination thereof. Furthermore, in cases where the UE 120 supports more than one L1-SINR measurement technique, the base station 110 may select one or more of the supported L1-SINR measurement techniques that offer the best performance, reliability, and/or the like.

Additionally, or alternatively, when the reference signal is transmitted on legacy reference signal resources based at least in part on the UE 120 indicating a lack of support for L1-SINR measurements, the reference signal may be transmitted and measured using legacy techniques (e.g., L1-RSRP measurement techniques).

As further shown in FIG. 3, and by reference number 340, the UE 120 may transmit, and the base station 110 may receive, a report (e.g., a periodic, semi-persistent, or aperiodic report) including the L1 measurement(s) obtained based at least in part on the reference signal transmitted by the base station 110. For example, in cases where the UE 120 indicates support for L1-SINR measurements, the L1 measurement(s) provided in the report may include one or more L1-SINR measurements that are obtained using one or more of the techniques described above. Additionally, or alternatively, the L1 measurement(s) provided in the report may include one or more legacy L1 measurements, such as an L1-RSRP measurement (e.g., when the UE 120 lacks support for L1-SINR measurement, as an additional L1 measurement in addition to the L1-SINR measurement, and/or the like). Accordingly, in this way, the base station 110 may configure subsequent communication parameters for the UE 120 (e.g., transmission power, beamforming configurations, and/or the like) based at least in part on the L1 measurement(s).

As indicated above, FIG. 3 is provided as an example. Other examples may differ from what is described with respect to FIG. 3.

Figure 4:
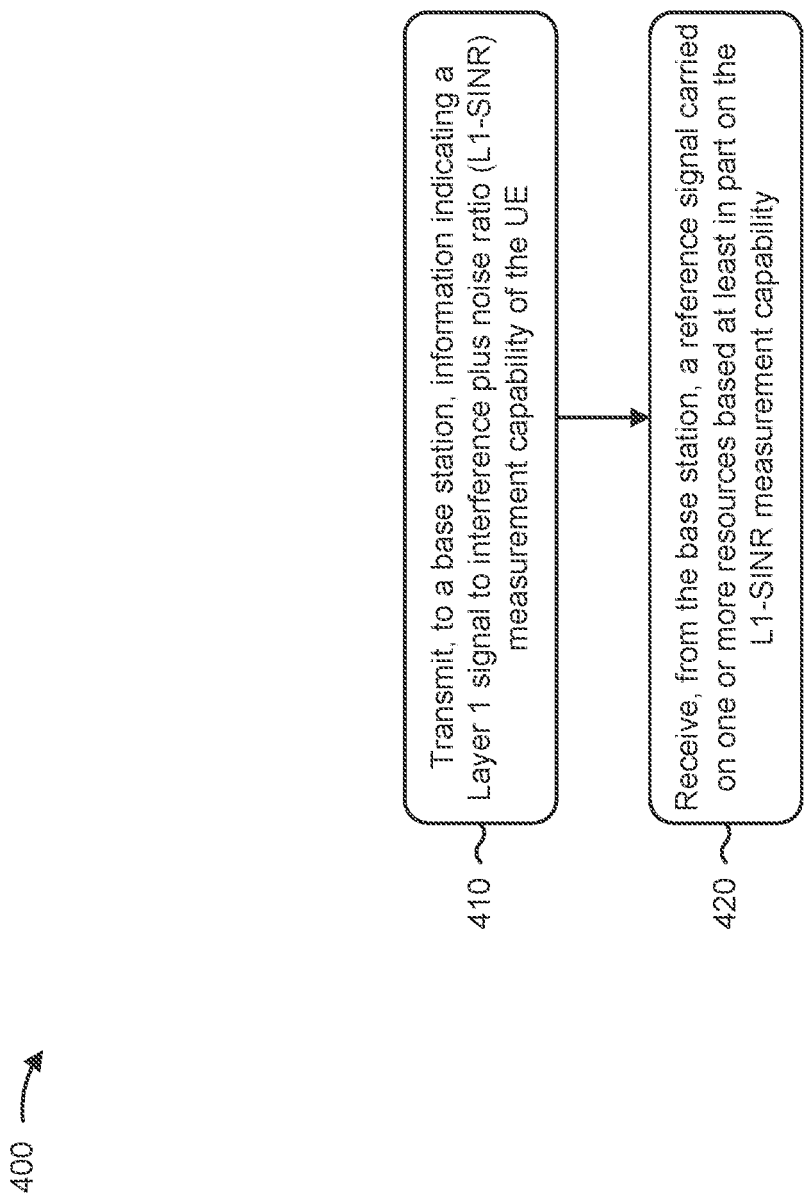
FIG. 4 is a diagram illustrating an example process performed, for example, by a UE, in accordance with various aspects of the present disclosure.

FIG. 4 is a diagram illustrating an example process 400 performed, for example, by a UE, in accordance with various aspects of the present disclosure. Example process 400 is an example where the UE (e.g., UE 120 and/or the like) performs operations associated with indicating a capability of the UE for L1-SINR measurement.

As shown in FIG. 4, in some aspects, process 400 may include transmitting, to a base station, information indicating an L1-SINR measurement capability of the UE (block 410). For example, the UE may transmit (e.g., using controller/processor 280, transmit processor 264, TX MIMO processor 266, MOD 254, antenna 252, and/or the like), to a base station, information indicating an L1-SINR measurement capability of the UE, as described above.

As further shown in FIG. 4, in some aspects, process 400 may include receiving, from the base station, a reference signal carried on one or more resources based at least in part on the L1-SINR measurement capability (block 420). For example, the UE may receive (e.g., using antenna 252, DEMOD 254, MIMO detector 256, receive processor 258, controller/processor 280, memory 282, and/or the like), from the base station, a reference signal carried on one or more resources based at least in part on the L1-SINR measurement capability, as described above.

Process 400 may include additional aspects, such as any single aspect or any combination of aspects described below and/or in connection with one or more other processes described elsewhere herein.

In a first aspect, the information indicating the L1-SINR measurement capability jointly indicates whether the UE supports a plurality of configurations for the one or more resources to carry the reference signal.

In a second aspect, alone or in combination with the first aspect, the plurality of configurations for the one or more resources to carry the reference signal include a first configuration in which the one or more resources to carry the reference signal include a CMR without a dedicated IMR, a second configuration in which the one or more resources to carry the reference signal include a CMR with a dedicated ZP IMR, a third configuration in which the one or more resources to carry the reference signal include a CMR with a dedicated NZP IMR, and a fourth configuration in which the one or more resources to carry the reference signal include a CMR with a dedicated ZP IMR and a dedicated NZP IMR.

In a third aspect, alone or in combination with one or more of the first and second aspects, the information indicating the L1-SINR measurement capability separately indicates whether the UE supports one or more individual configurations for the one or more resources to carry the reference signal.

In a fourth aspect, alone or in combination with one or more of the first through third aspects, the one or more individual configurations include a configuration in which the one or more resources to carry the reference signal include a CMR without a dedicated IMR.

In a fifth aspect, alone or in combination with one or more of the first through fourth aspects, the one or more individual configurations include a configuration in which the one or more resources to carry the reference signal include a CMR with a dedicated IMR in which the base station does not transmit a signal.

In a sixth aspect, alone or in combination with one or more of the first through fifth aspects, the one or more individual configurations include a configuration in which the one or more resources to carry the reference signal include a CMR with a dedicated NZP IMR.

In a seventh aspect, alone or in combination with one or more of the first through sixth aspects, the one or more individual configurations include a configuration in which the one or more resources to carry the reference signal include a CMR with a dedicated IMR and a dedicated NZP IMR.

In an eighth aspect, alone or in combination with one or more of the first through seventh aspects, process 400 includes obtaining an L1-SINR measurement based at least in part on the reference signal and transmitting a report including the L1-SINR measurement to the base station.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
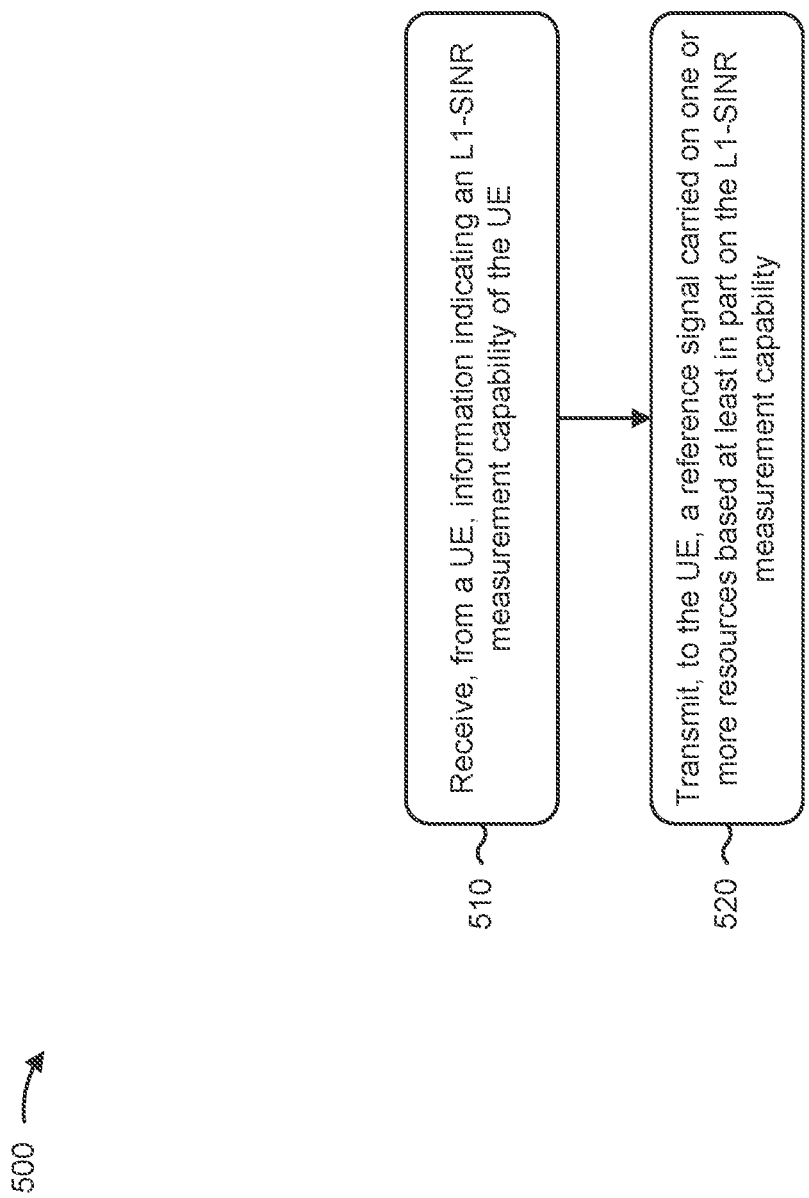
FIG. 5 is a diagram illustrating an example process performed, for example, by a base station, in accordance with various aspects of the present disclosure.

FIG. 5 is a diagram illustrating an example process 500 performed, for example, by a base station, in accordance with various aspects of the present disclosure. Example process 500 is an example where the base station (e.g., base station 110 and/or the like) performs operations associated with an indicated UE capability for L1-SINR measurement.

As shown in FIG. 5, in some aspects, process 500 may include receiving, from a UE, information indicating an L1-SINR measurement capability of the UE (block 510). For example, the base station may receive (e.g., using antenna 234, DEMOD 232, MIMO detector 236, receive processor 238, controller/processor 240, and/or the like), from a UE, information indicating an L1-SINR measurement capability of the UE, as described above.

As further shown in FIG. 5, in some aspects, process 500 may include transmitting, to the UE, a reference signal carried on one or more resources based at least in part on the L1-SINR measurement capability (block 520). For example, the base station may transmit (e.g., using controller/processor 240, transmit processor 220, TX MIMO processor 230, MOD 232, antenna 234, and/or the like) may transmit, to the UE, a reference signal carried on one or more resources based at least in part on the L1-SINR measurement capability, as described above.

Process 500 may include additional aspects, such as any single aspect or any combination of aspects described below and/or in connection with one or more other processes described elsewhere herein.

In a first aspect, the information indicating the L1-SINR measurement capability jointly indicates whether the UE supports a plurality of configurations for the one or more resources to carry the reference signal.

In a second aspect, alone or in combination with the first aspect, the plurality of configurations for the one or more resources to carry the reference signal include a first configuration in which the one or more resources to carry the reference signal include a CMR without a dedicated IMR, a second configuration in which the one or more resources to carry the reference signal include a CMR with a dedicated ZP IMR, a third configuration in which the one or more resources to carry the reference signal include a CMR with a dedicated NZP IMR, and a fourth configuration in which the one or more resources to carry the reference signal include a CMR with a dedicated ZP IMR and a dedicated NZP In a third aspect, alone or in combination with one or more of the first and second aspects, the information indicating the L1-SINR measurement capability separately indicates whether the UE supports one or more individual configurations for the one or more resources to carry the reference signal.

In a fourth aspect, alone or in combination with one or more of the first through third aspects, the one or more individual configurations include a configuration in which the one or more resources to carry the reference signal include a CMR without a dedicated IMR.

In a fifth aspect, alone or in combination with one or more of the first through fourth aspects, the one or more individual configurations include a configuration in which the one or more resources to carry the reference signal include a CMR with a dedicated IMR in which the base station does not transmit a signal.

In a sixth aspect, alone or in combination with one or more of the first through fifth aspects, the one or more individual configurations include a configuration in which the one or more resources to carry the reference signal include a CMR with a dedicated NZP In a seventh aspect, alone or in combination with one or more of the first through sixth aspects, the one or more individual configurations include a configuration in which the one or more resources to carry the reference signal include a CMR with a dedicated IMR and a dedicated NZP IMR.

In an eighth aspect, alone or in combination with one or more of the first through seventh aspects, process 500 includes receiving, from the UE, a report including an L1-SINR measurement obtained by the UE based at least in part on the reference signal.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
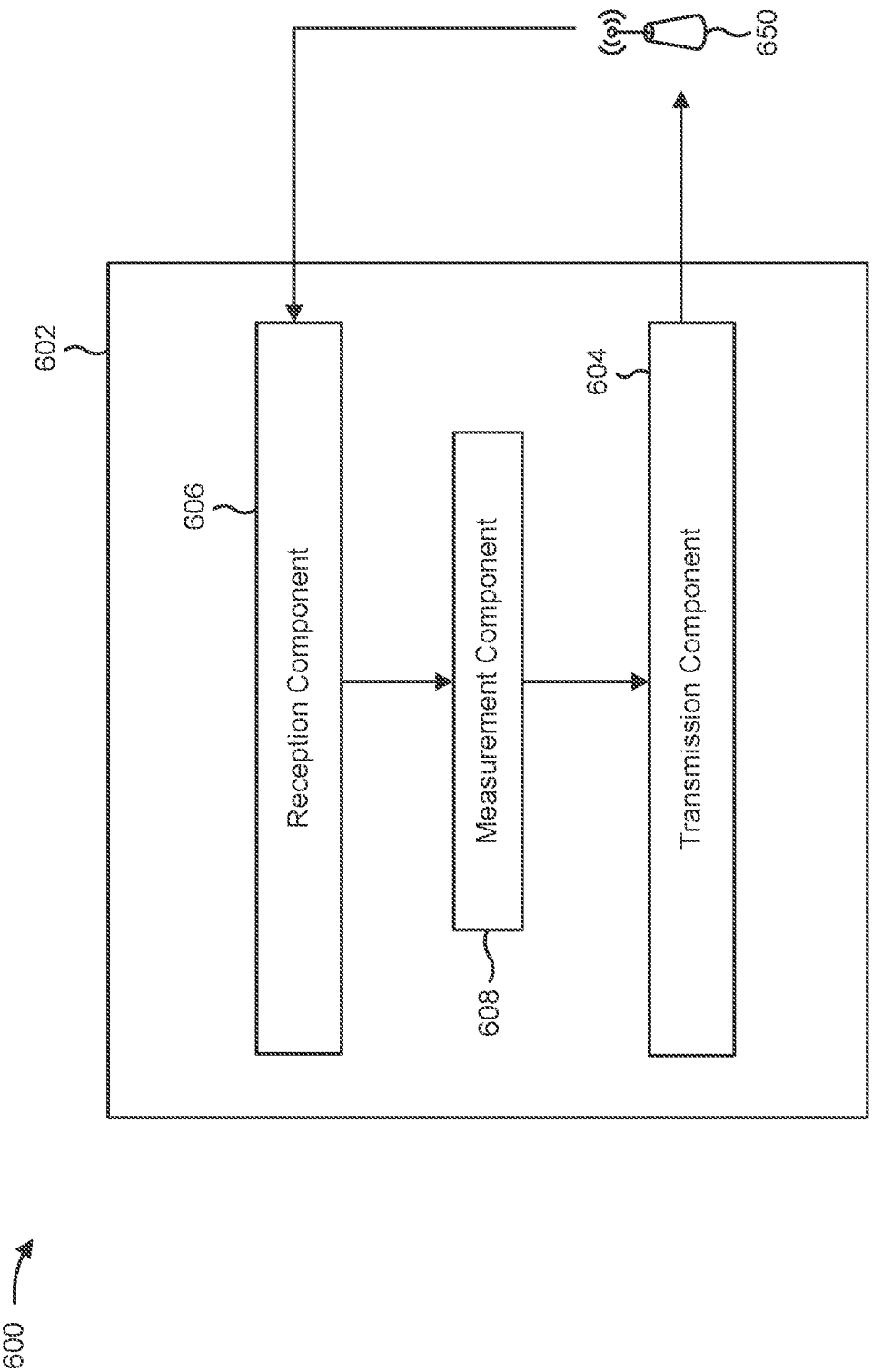
FIGS. 6-7 are diagrams illustrating example data flows between different components in example apparatuses, in accordance with various aspects of the present disclosure.

FIG. 6 is a diagram illustrating an example 600 of a data flow between different components in an example apparatus 602. The apparatus 602 may be a UE (e.g., UE 120). In some aspects, the apparatus 602 includes a transmission component 604, a reception component 606, a measurement component 608, and/or the like.

The transmission component 604 may transmit (e.g., to an apparatus 650, such as a base station 110) information indicating an L1-SINR measurement capability of the apparatus 602. For example, in some aspects, the information indicating the L1-SINR measurement capability may jointly indicate whether the apparatus 602 supports a plurality of configurations for the one or more resources to carry the reference signal. Additionally, or alternatively, the information indicating the L1-SINR measurement capability may separately indicate whether the apparatus 602 supports one or more individual configurations for the one or more resources to carry the reference signal. The reception component 606 may receive (e.g., from apparatus 650) a reference signal carried on one or more resources based at least in part on the L1-SINR measurement capability of the apparatus 602. The measurement component 608 may obtain one or more measurements based at least in part on the reference signal, and the transmission component 604 may transmit (e.g., to apparatus 650) a report including the one or more measurements. For example, in some aspects, the one or more measurements may include an L1-SINR measurement in cases where the L1-SINR measurement capability indicates that the apparatus 602 supports one or more configurations for the one or more resources that enable L1-SINR measurement.

The apparatus 602 may include additional components that perform each of the blocks of the algorithm in the aforementioned process 400 of FIG. 4 and/or the like. Each block in the aforementioned process 400 of FIG. 4 and/or the like may be performed by a component and the apparatus 602 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of components (e.g., one or more components) shown in FIG. 6 may perform one or more functions described as being performed by another set of components shown in FIG. 6.

Figure 7:
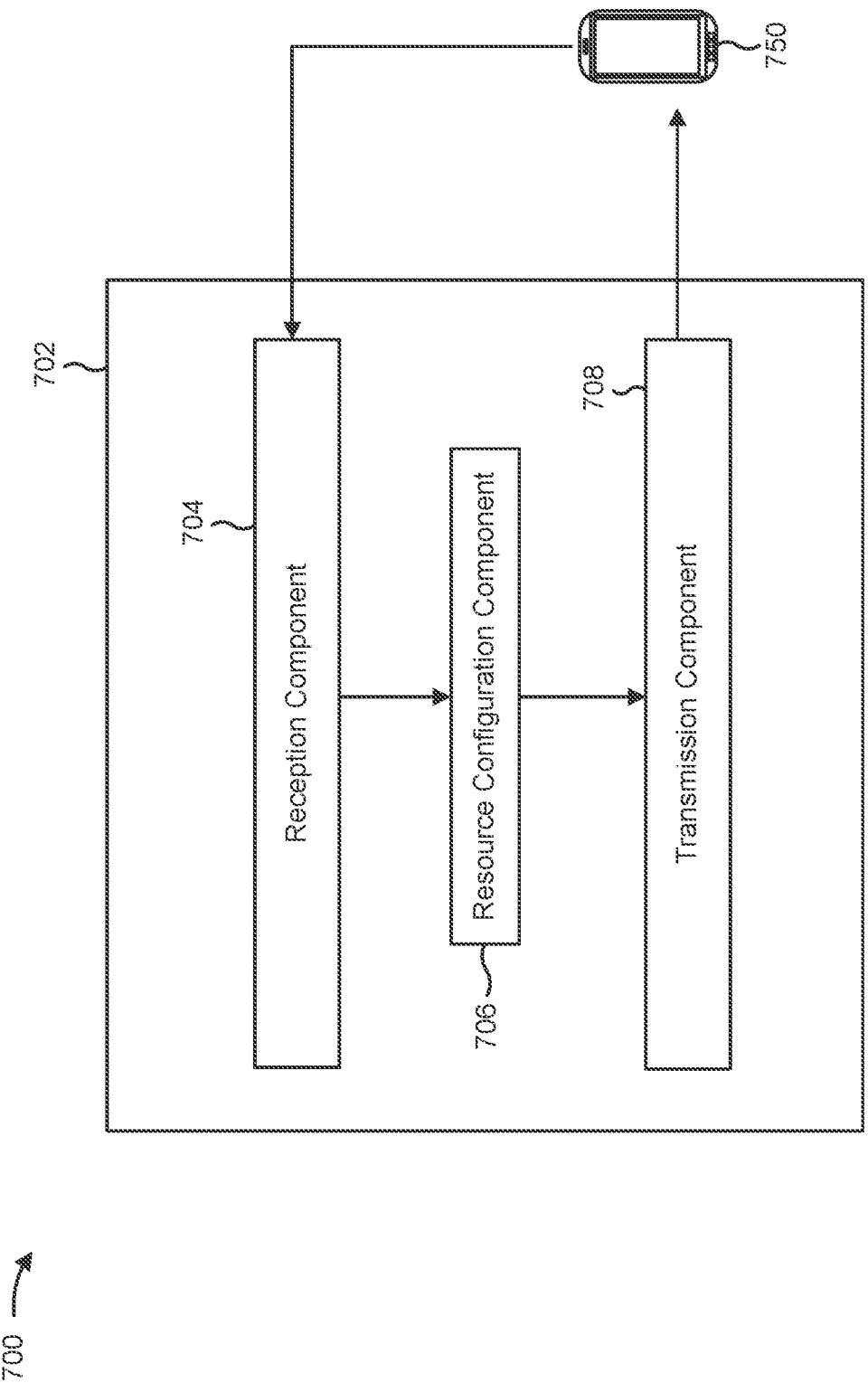

FIG. 7 is a diagram illustrating an example 700 of a data flow between different components in an example apparatus 702. The apparatus 702 may be a base station (e.g., base station 110). In some aspects, the apparatus 702 includes a reception component 704, a resource configuration component 706, a transmission component 708, and/or the like.

The reception component 704 may receive (e.g., from an apparatus 750, such as a UE 120) information indicating an L1-SINR measurement capability of the apparatus 750. For example, in some aspects, the information indicating the L1-SINR measurement capability may jointly indicate whether the apparatus 750 supports a plurality of configurations for the one or more resources to carry the reference signal. Additionally, or alternatively, the information indicating the L1-SINR measurement capability may separately indicate whether the apparatus 750 supports one or more individual configurations for the one or more resources to carry the reference signal. Accordingly, in some aspects, the resource configuration component 706 may select, configure, or otherwise determine one or more resources to carry a reference signal based at least in part on the L1-SINR measurement capability of the apparatus 750, and the transmission component 708 may transmit (e.g., to apparatus 750) a reference signal carried on the one or more resources based at least in part on the L1-SINR measurement capability of the apparatus 750. Furthermore, in some aspects, the reception component 704 may receive (e.g., from apparatus 750) a report including one or more measurements based at least in part on the reference signal. For example, in some aspects, the one or more measurements may include an L1-SINR measurement in cases where the L1-SINR measurement capability indicates that the apparatus 750 supports one or more configurations for the one or more resources that enable L1-SINR measurement.

The apparatus 702 may include additional components that perform each of the blocks of the algorithm in the aforementioned process 500 of FIG. 5 and/or the like. Each block in the aforementioned process 500 of FIG. 5 and/or the like may be performed by a component and the apparatus 702 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of components (e.g., one or more components) shown in FIG. 7 may perform one or more functions described as being performed by another set of components shown in FIG. 7.

The following provides an overview of aspects of the present disclosure:

Aspect 1: A method of wireless communication performed by a UE, comprising: transmitting, to a base station, information indicating an L1-SINR measurement capability of the UE; and receiving, from the base station, a reference signal carried on one or more resources based at least in part on the L1-SINR measurement capability.

Aspect 2: The method of aspect 1, wherein the information indicating the L1-SINR measurement capability jointly indicates whether the UE supports a plurality of configurations for the one or more resources to carry the reference signal.

Aspect 3: The method of aspect 2, wherein the plurality of configurations for the one or more resources to carry the reference signal include: a first configuration in which the one or more resources to carry the reference signal include a CMR without a dedicated IMR, a second configuration in which the one or more resources to carry the reference signal include a CMR with a dedicated ZP IMR, a third configuration in which the one or more resources to carry the reference signal include a CMR with a dedicated NZP IMR, and a fourth configuration in which the one or more resources to carry the reference signal include a CMR with a dedicated ZP IMR and a dedicated NZP IMR.

Aspect 4: The method of aspect 1, wherein the information indicating the L1-SINR measurement capability separately indicates whether the UE supports one or more individual configurations for the one or more resources to carry the reference signal.

Aspect 5: The method of aspect 4, wherein the one or more individual configurations include a configuration in which the one or more resources to carry the reference signal include a CMR without a dedicated IMR.

Aspect 6: The method of any of aspects 4 through 5, wherein the one or more individual configurations include a configuration in which the one or more resources to carry the reference signal include a CMR with a dedicated IMR in which the base station does not transmit a signal.

Aspect 7: The method of any of aspects 4 through 6, wherein the one or more individual configurations include a configuration in which the one or more resources to carry the reference signal include a CMR with a dedicated NZP IMR.

Aspect 8: The method of any of aspects 4 through 7, wherein the one or more individual configurations include a configuration in which the one or more resources to carry the reference signal include a CMR with a dedicated IMR and a dedicated NZP IMR.

Aspect 9: The method of any of aspects 1 through 8, further comprising: obtaining an L1-SINR measurement based at least in part on the reference signal; and transmitting, to the base station, a report including the L1-SINR measurement.

Aspect 10: A method of wireless communication performed by a base station, comprising: receiving, from a UE, information indicating an L1-SINR measurement capability of the UE; and transmitting, to the UE, a reference signal carried on one or more resources based at least in part on the L1-SINR measurement capability.

Aspect 11: The method of aspect 10, wherein the information indicating the L1-SINR measurement capability jointly indicates whether the UE supports a plurality of configurations for the one or more resources to carry the reference signal.

Aspect 12: The method of aspect 11, wherein the plurality of configurations for the one or more resources to carry the reference signal include: a first configuration in which the one or more resources to carry the reference signal include a CMR without a dedicated IMR, a second configuration in which the one or more resources to carry the reference signal include a CMR with a dedicated ZP IMR, a third configuration in which the one or more resources to carry the reference signal include a CMR with a dedicated NZP IMR, and a fourth configuration in which the one or more resources to carry the reference signal include a CMR with a dedicated ZP IMR and a dedicated NZP IMR.

Aspect 13: The method of aspect 10, wherein the information indicating the L1-SINR measurement capability separately indicates whether the UE supports one or more individual configurations for the one or more resources to carry the reference signal.

Aspect 14: The method of aspect 13, wherein the one or more individual configurations include a configuration in which the one or more resources to carry the reference signal include a CMR without a dedicated IMR.

Aspect 15: The method of any of aspects 13 through 14, wherein the one or more individual configurations include a configuration in which the one or more resources to carry the reference signal include a CMR with a dedicated IMR in which the base station does not transmit a signal.

Aspect 16: The method of any of aspects 13 through 15, wherein the one or more individual configurations include a configuration in which the one or more resources to carry the reference signal include a CMR with a dedicated NZP IMR.

Aspect 17: The method of any of aspects 13 through 16, wherein the one or more individual configurations include a configuration in which the one or more resources to carry the reference signal include a CMR with a dedicated IMR and a dedicated NZP IMR.

Aspect 18: The method of any of aspects 10 through 17, further comprising: receiving, from the UE, a report including an L1-SINR measurement obtained by the UE based at least in part on the reference signal.

Aspect 19: An apparatus for wireless communication at a device, comprising a processor; memory coupled with the processor; and instructions stored in the memory and executable by the processor to cause the apparatus to perform the method of any of aspects 1-9.

Aspect 20: A device for wireless communication, comprising a memory and one or more processors coupled to the memory, the memory and the one or more processors configured to perform the method of any of aspects 1-9.

Aspect 21: An apparatus for wireless communication, comprising at least one means for performing the method of any of aspects 1-9.

Aspect 22: A non-transitory computer-readable medium storing code for wireless communication, the code comprising instructions executable by a processor to perform the method of any of aspects 1-9.

Aspect 23: A non-transitory computer-readable medium storing a set of instructions for wireless communication, the set of instructions comprising one or more instructions that, when executed by one or more processors of a device, cause the device to perform the method of any of aspects 1-9.

Aspect 24: An apparatus for wireless communication at a device, comprising a processor; memory coupled with the processor; and instructions stored in the memory and executable by the processor to cause the apparatus to perform the method of any of aspects 10-18.

Aspect 25: A device for wireless communication, comprising a memory and one or more processors coupled to the memory, the memory and the one or more processors configured to perform the method of any of aspects 10-18.

Aspect 26: An apparatus for wireless communication, comprising at least one means for performing the method of any of aspects 10-18.

Aspect 27: A non-transitory computer-readable medium storing code for wireless communication, the code comprising instructions executable by a processor to perform the method of any of aspects 10-18.

Aspect 28: A non-transitory computer-readable medium storing a set of instructions for wireless communication, the set of instructions comprising one or more instructions that, when executed by one or more processors of a device, cause the device to perform the method of any of aspects 10-18.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
  transmitting, to a network entity, information indicating a Layer 1 signal to interference plus noise ratio (L1-SINR) measurement capability of the UE,
    wherein the information indicating the L1-SINR measurement capability indicates:
      a first configuration for a reference signal, and
      a second configuration for the reference signal, and
    wherein the first configuration includes a configuration for a channel measurement resource (CMR) without a dedicated interference measurement resource (IMR); and
  measuring the reference signal based at least in part on the L1-SINR measurement capability.

2. The method of claim 1, wherein the information indicating the L1-SINR measurement capability further indicates:
  a third configuration for the reference signal.

3. The method of claim 2,
  wherein the second configuration is a configuration in which the one or more resources include a CMR and a dedicated zero power IMR (ZP IMR), and
  wherein the third configuration is one of:
    a configuration in which the one or more resources for the reference signal include a CMR with a dedicated non-zero power IMR (NZP IMR), or
    a configuration in which the one or more resources for the reference signal include a CMR with a dedicated ZP IMR and a dedicated NZP IMR.

4. The method of claim 2, wherein the information indicating the L1-SINR measurement capability further indicates:
  a fourth configuration for the reference signal.

5. The method of claim 1, wherein the second configuration includes a configuration in for a CMR with a dedicated IMR in which the network entity does not transmit a signal.

6. The method of claim 1, wherein the second configuration includes a configuration for a CMR with a dedicated non-zero power interference measurement resource (NZP IMR).

7. The method of claim 1, wherein the second configuration includes a configuration for a CMR with a dedicated IMR and a dedicated non-zero power interference measurement resource (NZP IMR).

8. The method of claim 1, further comprising:
  obtaining an L1-SINR measurement based at least in part on the reference signal; and
  transmitting, to the network entity, a report including the L1-SINR measurement.

9. The method of claim 1, wherein the reference signal is a channel state information reference signal (CSI-RS).

10. A method of wireless communication performed by a network entity, comprising:
  receiving, from a user equipment (UE), information indicating a Layer 1 signal to interference plus noise ratio (L1-SINR) measurement capability of the UE,
    wherein the information indicating the L1-SINR measurement capability indicates:
      a first configuration for a reference signal, and
      a second configuration for the reference signal, and
    wherein the first configuration includes a configuration for a channel measurement resource (CMR) without a dedicated interference measurement resource (IMR); and
  transmitting, to the UE, a reference signal based at least in part on the L1-SINR measurement capability.

11. The method of claim 10, wherein the information indicating the L1-SINR measurement capability further indicates:
  a third configuration for the reference signal.

12. The method of claim 11,
  wherein the second configuration is a configuration in which the one or more resources for the reference signal include a CMR and a dedicated zero power IMR (ZP IMR), and
  wherein the third configuration is one of:
    a configuration in which the one or more resources for the reference signal include a CMR with a dedicated non-zero power IMR (NZP IMR), or
    a configuration in which the one or more resources for the reference signal include a CMR with a dedicated ZP IMR and a dedicated NZP IMR.

13. The method of claim 11, wherein the information indicating the L1-SINR measurement capability further indicates:
  a fourth configuration for the reference signal.

14. The method of claim 10, wherein the second configuration includes a configuration for a CMR with a dedicated IMR in which the network entity does not transmit a signal.

15. The method of claim 10, wherein the second configuration includes a configuration for a CMR with a dedicated non-zero power interference measurement resource (NZP IMR).

16. The method of claim 10, wherein the second configuration includes a configuration for a CMR with a dedicated IMR and a dedicated non-zero power interference measurement resource (NZP IMR).

17. The method of claim 10, further comprising:
receiving, from the UE, a report including an L1-SINR measurement obtained by the UE based at least in part on the reference signal.

18. The method of claim 10, wherein the reference signal is a channel state information reference signal (CSI-RS).

19. A user equipment (UE) for wireless communication, comprising:
a memory; and
one or more processors, coupled to the memory, configured to:
transmit, to a network entity, information indicating a Layer 1 signal to interference plus noise ratio (L1-SINR) measurement capability of the UE,
wherein the information indicating the L1-SINR measurement capability indicates:
a first configuration for a reference signal, and
a second configuration for the reference signal, and
wherein the first configuration includes a configuration for a channel measurement resource (CMR) without a dedicated interference measurement resource (IMR); and
measure the reference signal based at least in part on the L1-SINR measurement capability.

20. The UE of claim 19, wherein the information indicating the L1-SINR measurement capability further indicates:
a third configuration for the one or more resources for the reference signal.

21. The UE of claim 19, wherein the second configuration includes a configuration for a CMR with a dedicated IMR.

22. The UE of claim 19, wherein the second configuration includes a configuration for a CMR with a dedicated non-zero power interference measurement resource (NZP IMR).

23. The UE of claim 19, wherein the second configuration includes a configuration for a CMR with a dedicated zero power interference measurement resource (ZP IMR) and a dedicated non-zero power interference measurement resource (NZP IMR).

24. The UE of claim 19, wherein the reference signal is a channel state information reference signal (CSI-RS).

25. A network entity for wireless communication, comprising:
a memory; and
one or more processors, coupled to the memory, configured to:
receive, from a user equipment (UE), information indicating a Layer 1 signal to interference plus noise ratio (L1-SINR) measurement capability of the UE,
wherein the information indicating the L1-SINR measurement capability indicates:
a first configuration for a reference signal, and
a second configuration for the reference signal, and
wherein the first configuration includes a configuration for a channel measurement resource (CMR) without a dedicated interference measurement resource (IMR); and
transmit, to the UE, a reference signal based at least in part on the L1-SINR measurement capability.

26. The network entity of claim 25, wherein the information indicating the L1-SINR measurement capability further indicates:
a third configuration for the reference signal.

27. The network entity of claim 25, wherein the second configuration includes a configuration for a channel measurement resource (CMR) with a dedicated interference measurement resource.

28. The network entity of claim 25, wherein the second configuration includes a configuration for a channel measurement resource (CMR) with a dedicated non-zero power interference measurement resource (NZP IMR).

29. The network entity of claim 25, wherein the second configuration includes a configuration for a CMR with a dedicated IMR and a dedicated non-zero power interference measurement resource (NZP IMR).

30. The network entity of claim 25, wherein the reference signal is a channel state information reference signal (CSI-RS).

* * * * *